United States Patent [19]
Watson

[11] Patent Number: 5,764,680
[45] Date of Patent: Jun. 9, 1998

[54] FOLDED INTERNAL BEAM PATH FOR GAS STABLE/UNSTABLE RESONATOR LASER

[76] Inventor: Tom A. Watson, 4427 Salisbury Dr., Carlsbad, Calif. 92008

[21] Appl. No.: 689,749

[22] Filed: Aug. 13, 1996

[51] Int. Cl.$^6$ ............................................. H01S 3/181
[52] U.S. Cl. .......................... 372/93; 372/95; 372/99; 372/103; 372/55; 372/92
[58] Field of Search ........................... 372/92, 93, 95, 372/99, 55, 103, 98, 107, 108, 100

[56] References Cited

U.S. PATENT DOCUMENTS

| | | | |
|---|---|---|---|
| 4,669,088 | 5/1987 | Waite | 372/95 |
| 4,792,765 | 12/1988 | Smith et al. | 372/95 |
| 5,023,886 | 6/1991 | Hobart et al. | 372/93 |
| 5,307,367 | 4/1994 | Karube | 372/93 |
| 5,596,594 | 1/1997 | Egawa | 372/93 |

*Primary Examiner*—Leon Scott, Jr.

[57] ABSTRACT

A gas stable/unstable resonator laser having a folded internal beam path includes a front reflective surface (25) mounted substantially perpendicular to the electrodes (21(1),21(2)), and a rear reflective surface (24) mounted substantially parallel to the front reflective surface. A lower fold reflective surface (26') is mounted substantially adjacent to and at approximately a 45 degree angle with respect to the front reflective surface (25) and an upper fold reflective surface (28') is mounted at approximately a 90 degree angle with respect to the lower fold reflective surface (26'). Light energy (27) is reflected between the front reflective surface and rear reflective surface and subsequently reflects off the lower fold reflective surface (26'). Light energy is then reflected from the lower fold reflective surface (26') to the upper fold reflective surface (28'), passing the light energy substantially perpendicular to the front reflective surface and rear reflective surface. Light energy (32) is then reflected through an output window (29), having a beam aspect ratio of approximately 1 so that the beam may be corrected by a single cylindrical lens.

26 Claims, 4 Drawing Sheets

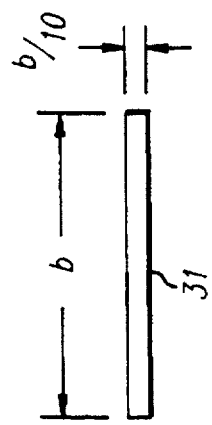
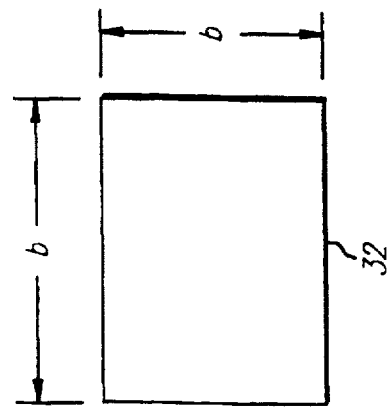
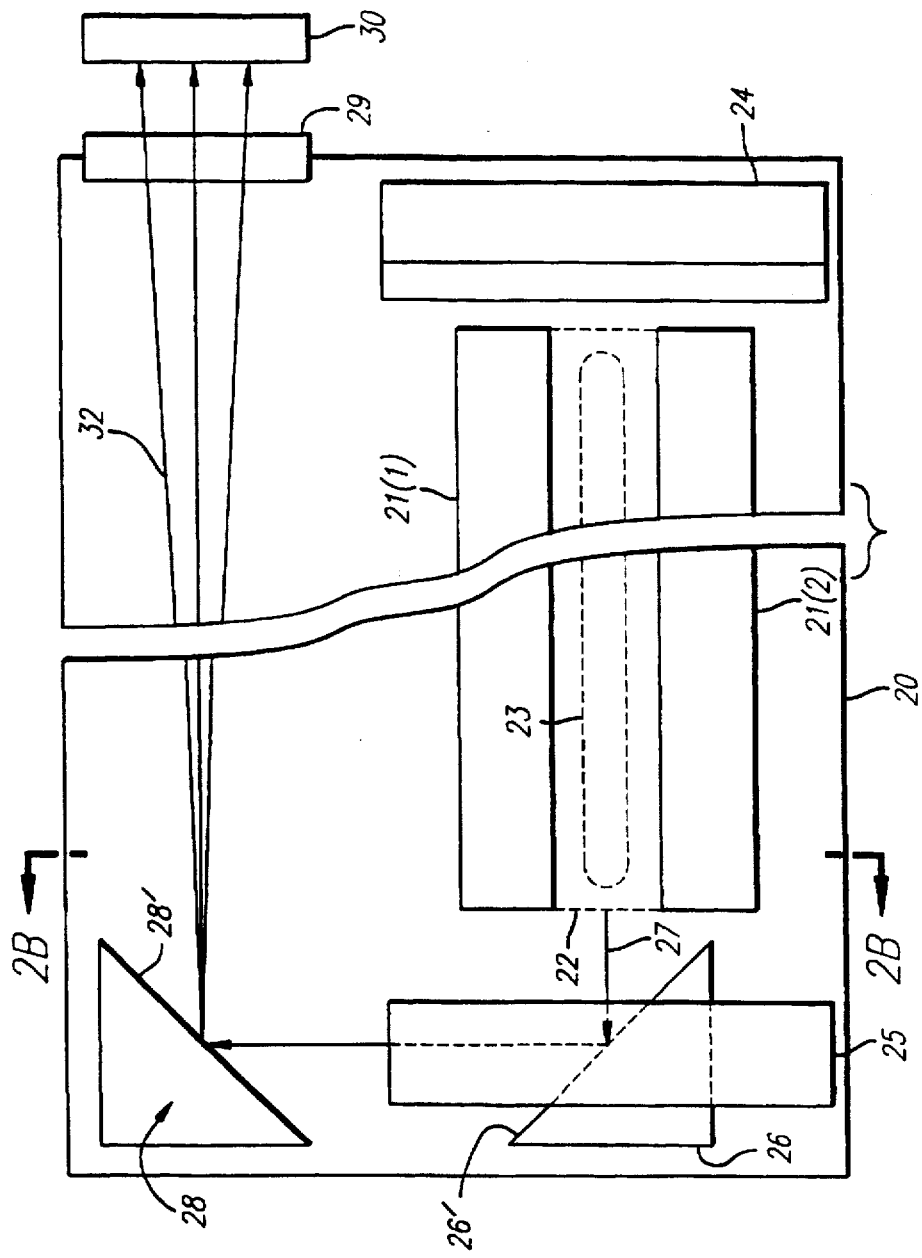

FOLDED INTERNAL BEAM PATH FOR GAS STABLE/UNSTABLE RESONATOR LASER

BACKGROUND OF THE INVENTION

1. Field of the Invention

This invention relates to gas stable/unstable resonator lasers, and more particularly to increasing the beam aspect ratio of such lasers in order to easily correct the laser beam transmitted and improve overall system performance.

2. Description of Related Art

Stable/unstable laser resonators are generally known in the laser art to provide beneficial properties but which require complex optical components.

In such stable/unstable systems, the active medium is formed by a thin slab or gain sheet, which may have a very small equivalent Fresnel number in one traverse direction, and a much larger width or equivalent Fresnel number in another transverse direction. The equivalent Fresnel number is the relative phase shift between the magnifying and demagnifying geometrical eigenwaves at the aperture edge, which may be disadvantageously very large in unstable resonators. A stable laser cavity may be used in conjunction with this active medium, said laser cavity supporting a lowest-order $TEM_0$ gaussian mode in one direction but is unstable in the other direction. The advantage to such a configuration is that the diffraction-limited performance is relatively high for large Fresnel numbers. Several different implementations for stable/unstable lasers are currently employed, including those developed by German scientists for the German government agency DLR. The advantages and disadvantages discussed above are more fully outlined in the text *Lasers*, by Anthony E. Siegman, University Science Books, 1986, Chapters 22 and 23.

Stable/unstable lasers require three primary elements, a lasing medium which provides ions or molecules which support light amplification, an energy source to excite the lasing medium, and an optical resonator to feed back the amplified light energy. Typical systems are approximately one meter in length and operate in the range of approximately 1 kW.

One of the most common lasing media used in current lasers is gas, and carbon dioxide is frequently used as a lasing media. Optical resonators come in several forms, and are constructed so as to provide for high lasing volume and high lasing mass. One such construction, a stable/unstable resonator, provides a pressure vessel containing a concave reflective surface at the rear of the energy source and a convex reflective surface facing the concave reflective surface at the front of the vessel.

Stable/unstable optical resonators are constructed so as to provide for a high lasing volume and a high lasing mass. These stable/unstable gas lasers are typically of the "coaxial" type having a long and narrow shape such as a tube having two mirrors located at both ends, two electrodes located between the mirrors, and the gas being introduced into the tube so that it flows in the direction of the laser beam produced in the resonator.

The stable/unstable laser configuration forms a powerful confocal stable/unstable system in one axis. The ratio of the radii of curvature between the front and rear reflective surfaces form the magnification of the resonator, and the magnification must be within a certain range to provide adequate output. The magnification and front/rear curvature ratio requirements are generally known to those skilled in the stable/unstable resonator art, but generally the ratio of the rear curvature to the front curvature must be two times the cavity length for optimal performance.

Stable/unstable resonator carbon dioxide lasers employ an output window on the pressure vessel immediately adjacent to the unstable resonator hard edged mirror. Because of the very narrow waveguide dimension of such a laser, typically less than or equal to two millimeters, the beam is highly asymmetrical at the output window. Dimensions of the beam output are typically less than or equal to two millimeters on one axis and from five to twenty millimeters on the other axis. As the ratio of these dimensions increases beyond a factor of approximately five, two disadvantages of this type of beam become apparent.

First, the measured power density on the window typically becomes excessive, leading to thermally induced lensing or aberration of the beam, and in extreme cases to thermal damage of the window coating. Water cooling of the metal resonator mirrors decreases the window power density problem.

Second, as the aspect ratio of the astigmatic beam increases, the power or magnification of the optics required to symmetrize the beam becomes greater for a constant size telescope. For rotationally symmetric optical systems, aberrations are easily corrected by employing general aspheric surfaces which can be inexpensively fabricated using modern diamond turning equipment. However, for asymmetric systems the only two conic surfaces able to be diamond machined are a right circular cylinder and an ellipse, greatly reducing the design flexibility available for aberration correction.

SUMMARY OF THE INVENTION

Accordingly, it is a principal object of the current invention to create a laser which reduces the power density applied to the transmissive pressure vessel window, thereby eliminating thermally induced lensing and optical coating degradation.

It is another object of the current invention to provide a compact and well corrected beam expansion telescope to easily focus the beam transmitted from the pressure vessel.

According to a preferred embodiment of the present invention, there is provided a gas stable/unstable resonator laser having a folded internal beam path comprising a parallel pair of electrodes and a laser gas disposed between the electrodes. A front reflective surface is mounted substantially perpendicular to the electrodes, and a rear reflective surface is mounted substantially parallel to the front reflective surface, forming the stable/unstable resonator. The resonator laser contains a lower fold reflective surface mounted at approximately a 45 degree angle with respect to the front reflective surface and an upper fold reflective surface mounted at approximately a 90 degree angle with respect to the lower fold reflective surface.

An electrical charge is applied to the pair of electrodes thereby exciting the laser gas and producing light energy. The light energy is reflected between the front reflective surface and rear reflective surface and subsequently reflects off the lower fold reflective surface. Light energy is then reflected from the lower fold reflective surface to the upper fold reflective surface, passing the light energy substantially perpendicular to the front reflective surface and rear reflective surface, and then reflected through an output window.

In the preferred embodiment, the front reflective surface and rear reflective surface are approximately 1 meter apart. Additionally, the upper fold reflective surface and the output window are approximately 1 meter apart. The preferred embodiment of the stable/unstable gas laser resonator uses carbon dioxide as the laser gas and operates in the range of 0.5 to 3 kilowatts. The beam aspect ratio of the folded internal beam measured at the output window is approximately 1. After passing through the output window, the beam may be corrected by a single cylindrical lens.

Other objects, features, and advantages of the present invention will become more apparent from a consideration of the following detailed description and from the accompanying drawings.

DESCRIPTION OF THE DRAWINGS

FIG. 2A–2C is a side view of the stable/unstable laser resonator having a folded internal beam path.

FIG. 3A–3B show the differences beteen the beam aspect ratio of the prior art and the current invention.

DESCRIPTION OF THE PREFERRED EMBODIMENT

Figure 1A:
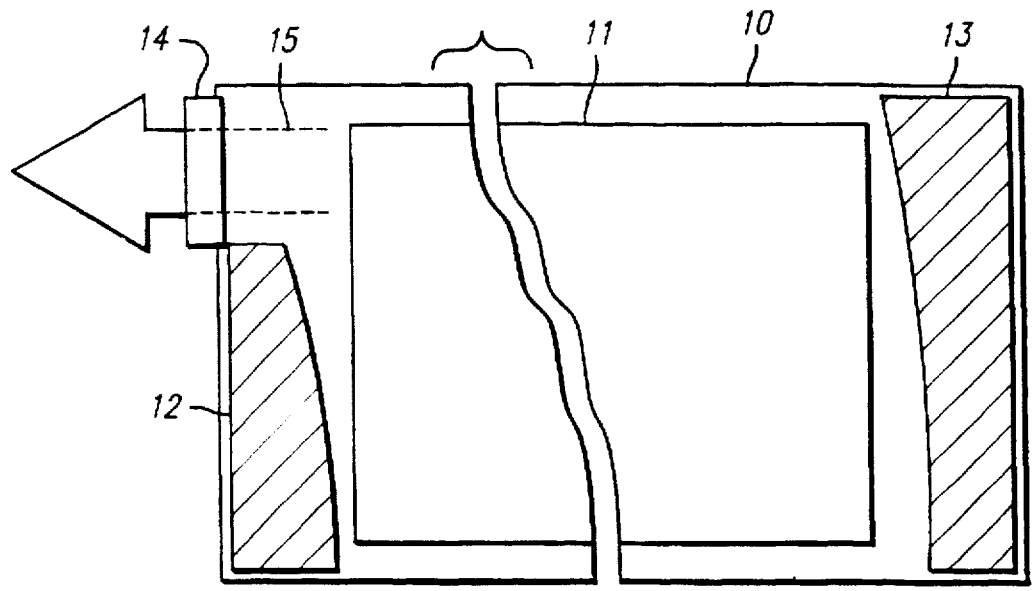
FIG. 1A shows a top view of a stable/unstable laser resonator known in the prior art.

FIG. 1A shows the top view of a stable/unstable resonator of the prior art, having overall length of approximately one meter. The stable/unstable resonator is enclosed in a pressure vessel 10, having enclosed therein a first gain volume 11. Laser gas, under pressure, is contained in the first gain volume. The laser gas is excited in first gain volume 11, and excited molecules emanate from first gain volume 11 and strike a first front reflective surface 12, having convex shape, and a first rear reflective surface 13, having concave shape, being reflected back and forth between the reflective surfaces at a resonant frequency of the beam. Feedback of the light energy occurs through first gain volume 11 and light energy is eventually transmitted as an output laser beam 15 formed by diffraction around one edge of front mirror 12 to and through a window 14. The output beam has a width b, generally approximately 20 millimeters, through first output window 14. In this prior art device the output window is located closely adjacent the front reflective surface 12. The elements in the drawing are not drawn to scale.

Figure 1B:
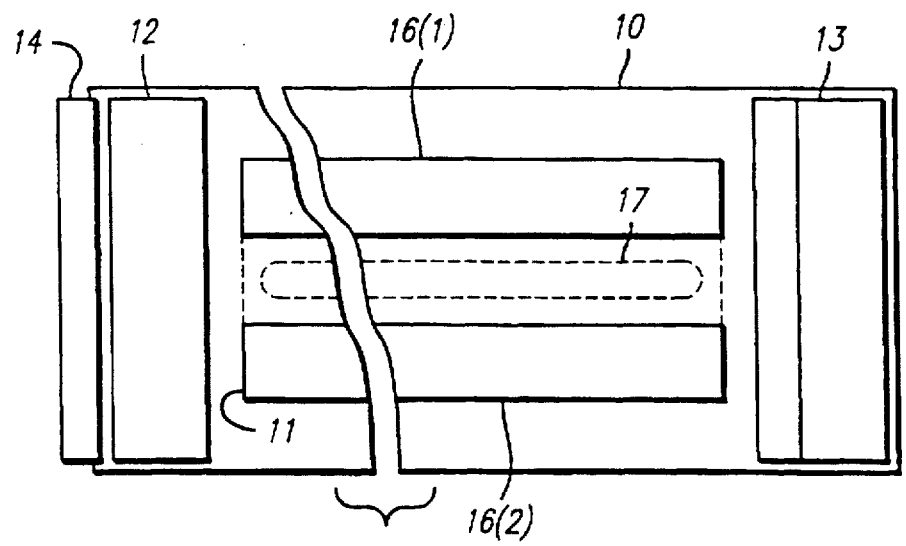
FIG. 1B illustrates a side view of the laser resonator known in the prior art.

FIG. 1B shows a side view of the gas laser resonator of the prior art shown in FIG. 1A. First gain volume 11 includes a first upper electrode 16(1) and a first lower electrode 16(2) with a pressurized gas 17 disposed within pressure vessel 10. The distance between first upper electrode 16(1) and first lower electrode 16(2) is typically approximately two millimeters. An electric voltage is applied to the first upper electrode 16(1) and the first lower electrode 16(2), and gas 17 is thereby excited and light energy is emitted. Light energy reflects between first front reflective surface 12 and first rear reflective surface 13, feeding back between first upper electrode 16(1) and first lower electrode 16(2). Light energy diffraction around one edge of front mirror 12 then passes through first output window 14 in the form of an outgoing laser beam 15. The gap between first upper electrode 16(1) and the first lower electrode 16(2) is approximately 2 millimeters, which is ten percent of the width of laser beam 15, and this is approximately the height of the laser beam 15 transmitted from first output window 14. The aspect ratio of the laser beam 15 transmitted from the pressure vessel 10 is thus approximately ten to one, 20 millimeters by 2 millimeters. The large aspect ratio at the first output window 14 leads to excessive power densities for high power devices. Correction of such high aspect ratio beams requires specialized and expensive corrective lenses to significantly up collimate the laser beam 15.

According to an embodiment of the present invention, the outgoing beam is shifted and folded and the output window is displaced to increase path length of the outgoing beam within the pressure vessel. Unlike the prior art, wherein the output window is closely adjacent the edge of the front mirror around which the outgoing beam diffracts, the output window of the disclosed embodiment of the present invention is positioned at a relatively great distance from the diffracting edge of the front mirror to establish a greatly increased path length that allows the narrow dimension of the beam to greatly increase within the pressure vessel. By effectively folding the outgoing beam through 180° and displacing it from the laser resonating volume, the beam, which has a high aspect ratio in the laser resonating volume, is propagated along an output path that is long enough to allow the beam, in its narrow dimension, to spread by diffraction to many times its original size. This spreading of the high aspect ratio beam in its narrow dimension results in an output beam of greatly deceased aspect ratio.

Figure 2B:
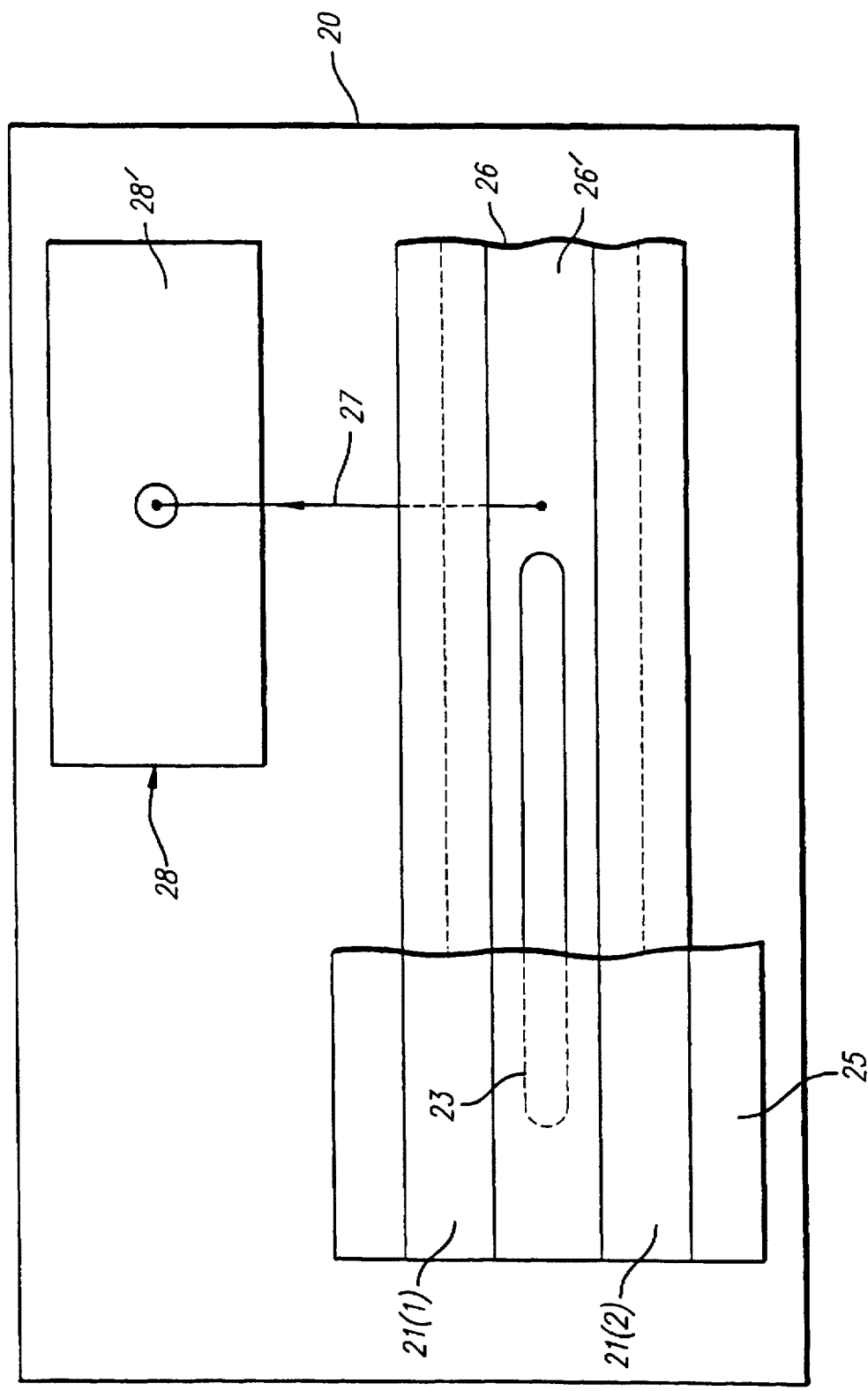
Figure 2C:
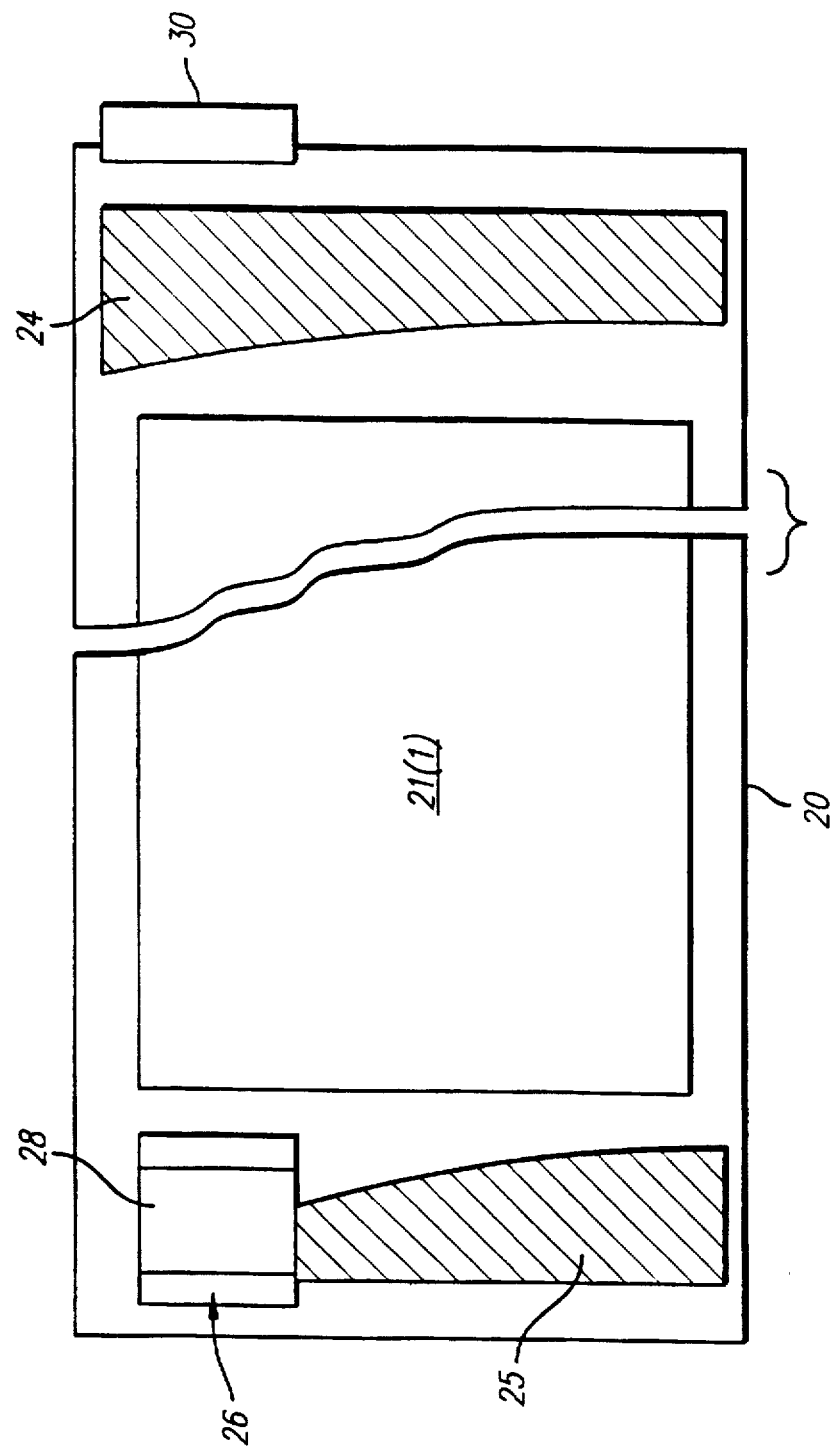

FIG. 2 illustrates a side view of the current invention. A pressure vessel 20 contains a gain volume 22, which includes an upper electrode 21(1) and a lower electrode 21(2). In the preferred embodiment, the voltage applied is 1.5 kilowatts, but similar results may be obtained for operations in the range of 0.5 to 3 kilowatts. Voltage is applied to upper electrode 21(1) and lower electrode 21(2), thus exciting a pressurized laser gas 23 and causing gain volume 22 to emit light energy, which is then resonantly reflected between front a reflective surface 25 and a rear reflective surface 24. Although shown as rectangles for convenience of illustration, front reflective surface 25 is again a stable concave reflective surface, while rear reflective surface 24 again is an unstable convex reflective surface, just as in the prior art device described above the laser gas is carbon dioxide in a preferred embodiment.

In the preferred embodiment, a lower reflector 26 having a lower reflective surface 26' is mounted adjacent to and at one side of front reflective surface 25. Lower reflective surface 26' is mounted at substantially a 45 degree angle to the front reflective surface 25. Light beam 27 is thus transmitted from the gain volume 22 after reflecting off front reflective surface 25 and rear reflective surface 24. The light beam deflects around one edge of reflective surface 25 just as in the prior art so as to allow the beam to escape from the laser gas gain volume immediately adjacent the edge of reflective surface 25. The beam then is received by and reflected at a right angle from surface 26' of lower reflector 26. Lower reflector 26 is located at approximately the same location relative to front reflective surface 25 as first output window 14 is located relative to front reflector 12 in the prior art. Light beam 27 contacts upper fold reflector 28, where upper fold reflective surface 28' is mounted at approximately a 90 degree angle to lower reflective surface 26' and at substantially a 135 degree angle with respect to the front reflective surface 25. Upper fold reflector 28 has the same dimensions as lower reflector 26, and is mounted approximately above lower reflector 26 in order to reflect the full width of light beam 27. When light beam 27 strikes lower reflector 26, the aspect ratio of light beam 27 is similar to the 10 to 1 aspect ratio received at first output window 14 of the prior art. Light beam 27 is reflected from upper fold reflector 28, at approximately a 90 degree angle relative to the direction of light transmitted from lower fold reflector 26 to upper fold reflector 28. Reflection of the light beam from upper fold reflector 28 results in an outgoing beam 32 that is substantially parallel to light beam 27 that is transmitted from gain volume 22. Light beam 32 has been transversely displaced and folded 180°. It will now travel a relatively long distance to output mirror 29.

Light beam 32 expands when transmitted over a distance through the laser gas that fills the pressure vessel, or spreads by diffraction. As shown in FIG. 2, light beam 32 expands in size until it reaches output window 29. Thus a greatly increased path length has been provided for transmission of the outgoing beam from the diffracting edge of conveys reflector 25. In the preferred embodiment, the distance between the midpoint of the upper fold reflective surface 28' to output window 29 is approximately 1 meter, and the width of light beam 27 up collimates approximately tenfold, or from roughly 2 millimeters to 20 millimeters for a carbon dioxide stable/unstable resonator. Light beam 32 emitted from output window 29 has an aspect ratio of approximately 1, or 20 millimeters by 20 millimeters, and thus may be corrected by single cylindrical lens 30 which may be easily and inexpensively fabricated.

In order to accommodate the upper fold reflector 28, repositioned output window 29 and expanding outgoing beam 32, the pressure vessel 20 is enlarged in the vertical direction, as reviewed in FIG. 2. The enlarged portion also contains pressurized gas (which may be carbon dioxide in a preferred embodiment). The outgoing beam 32 expands vertically by diffraction, as it passes through the gas from the upper fold reflector 28 to output window 29. Lateral expansion of beam 32 (e.g. expansion of its initial 20 mm dimension) is constrained by sides of the pressure vessel and the dimensions of the repositions output window 29.

FIG. 3 presents the aspect ratios of the beams transmitted by the prior art assembly and the current invention. At first output window 14 (of the prior art), first beam aspect ratio 31 is approximately 10 to 1, where width of laser beam 15 is approximately 20 millimeters and height of laser beam 15 is approximately 2 millimeters. Output from output window 29 of an embodiment of the present invention is shown as beam aspect ratio 34, and is approximately 1 to 1. Dimensions of light beam 32 are approximately 20 millimeters by 20 millimeters at output window 29. Expansion of the width of light beam 32 by diffraction reduces the intensity on output window 29 by this same factor of 10. Thus, internal expansion of light beam 32 allows for very simple collimation of such a beam to the same approximate beam width b by using single cylindrical lens 34 a short distance outside the output window 29.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A gas laser resonator having a decreased beam aspect ratio, comprising:
   a parallel pair of electrodes;
   a laser gas disposed between said parallel pair of electrodes;
   a front reflective surface mounted substantially perpendicular to said parallel pair of electrodes;
   a rear reflective surface mounted substantially parallel to said front reflective surface;
   a lower fold reflective surface mounted at approximately a 45 degree angle with respect to said front reflective surface; and
   an upper fold reflective surface mounted at approximately a 90 degree angle with respect to said lower fold reflective surface.

2. The apparatus for increasing the beam aspect ratio at the output window of the gas laser resonator of claim 1, wherein an electrical charge is exerted on said pair of electrodes thereby exciting said laser gas and producing light energy.

3. The apparatus for increasing beam aspect ratio of the gas laser resonator of claim 2, wherein said light energy is reflected between said front reflective surface and said rear reflective surface and reflects off said lower fold reflective surface.

4. The apparatus for increasing beam aspect ratio of the gas laser resonator of claim 3, wherein said light energy is further reflected from said lower fold reflective surface to said upper fold reflective surface thereby passing said light energy substantially perpendicular to said front reflective surface and said rear reflective surface.

5. The apparatus for increasing beam aspect ratio of the gas laser resonator of claim 4, wherein said light energy is reflected from said lower fold reflective surface through an output window adjacent said rear reflector surface and wherein said lower fold reflective surface is mounted adjacent said front reflective surface.

6. The apparatus for increasing beam aspect ratio of the gas laser resonator of claim 5, wherein said upper fold reflective surface and said output window are approximately 1 meter apart.

7. The apparatus for increasing beam aspect ratio of the gas laser resonator of claim 5, wherein said beam aspect ratio measured at said output window is approximately 1.

8. The gas laser resonator of claim 7, including a single cylindrical lens for correcting output from said output window.

9. The apparatus for increasing beam aspect ratio of the gas laser resonator of claim 1, wherein said front reflective surface and said rear reflective surface are approximately 1 meter apart.

10. The apparatus for increasing beam aspect ratio of the gas laser resonator of claim 1, wherein said gas laser resonator operates in the range of 0.5 to 3 kilowatts.

11. The apparatus for increasing beam aspect ratio of the gas laser resonator of claim 1, wherein said laser gas is carbon dioxide.

12. A stable/unstable resonator laser comprising:
   an elongated pressure vessel;
   front and rear reflectors in said pressure vessel;
   a gaseous medium in said pressure vessel between said reflectors;
   a pair of spaced exciting electrodes in said pressure vessel for exciting said gaseous medium;
   said front reflector providing an outgoing laser beam;
   an output window in said pressure vessel; and
   means for directing said outgoing laser beam along an extended path on said pressure vessel from said front reflector to said output window.

13. The stable/unstable resonator laser of claim 12 wherein said path has a length substantially equal to the distance between said reflectors.

14. The stable/unstable resonator laser of claim 12 wherein said path is transversely displaced from said reflectors and extends substantially perpendicular to the plane of at least one of said reflectors.

15. The stable/unstable resonator laser of claim 12 wherein said path includes a first leg extending transversely of the longitudinal extent of said elongated pressure vessel, and a second leg extending longitudinally of said elongated pressure vessel.

16. The stable/unstable resonator laser of claim 12 wherein said means for directing comprises a first turning mirror positioned adjacent said front reflector for directing said outgoing beam transversely of said front reflector, and a second turning mirror positioned to direct said transversely directed beam longitudinally of said pressure vessel toward said window.

17. The stable/unstable gas laser apparatus of claim 16, wherein said reflective surfaces are configured and arranged to reflect light energy between said front reflective surface and said rear reflective surface and from said front reflective surface to said lower fold reflective surface.

18. The stable/unstable gas laser apparatus of claim 16, wherein said upper fold reflective surface and said output window are approximately 1 meter apart.

19. The stable/unstable gas laser apparatus of claim 16, wherein said gas laser resonator operates in the range of 0.5 to 3 kilowatts.

20. The stable/unstable gas laser apparatus of claim 16, wherein said laser gas is carbon dioxide.

21. The stable/unstable gas laser apparatus of claim 20, wherein output from said output window may be corrected by a single cylindrical lens.

22. The stable/unstable gas laser apparatus of claim 16, wherein said light energy has a beam aspect ratio of about 1, measured at said output window.

23. A stable/unstable gas laser apparatus comprising:

a front refelctive surface;

a rear reflective surface mounted substantially parallel to said front reflective surface;

means for reflecting light energy between said reflective surfaces;

a lower fold reflective surface mounted substantially adjacent to and at an angle with respect to said front reflective surfaces;

an upper fold reflective surface mounted at an angle with respect to said lower fold reflective surface, and a window for receiving light energy from said upper fold reflective surface.

24. The stable/unstable gas laser apparatus of claim 23, wherein said lower fold and upper fold reflective surfaces are configured and arranged to reflect light energy from said lower fold reflective surface to said upper fold reflective surface and from said upper fold reflective surface to said output window thereby passing said light energy substantially perpendicular to said front reflective surface and said rear reflective surface.

25. The stable/unstable gas laser apparatus of claim 24, wherein said light energy is reflected from said lower fold reflective surface through an output window.

26. The stable/unstable gas laser apparatus of claim 24, wherein said front reflective surface and said rear reflective surface are approximately 1 meter apart.

* * * * *